United States Patent [19]

Nanba

[11] 4,039,824
[45] Aug. 2, 1977

[54] FOCUS DETECTING PHOTOELECTRIC DEVICE

[75] Inventor: Yasuhiro Nanba, Sennan, Japan

[73] Assignee: Minolta Camera Kabushiki Kaisha, Osaka, Japan

[21] Appl. No.: 594,075

[22] Filed: July 8, 1975

[30] Foreign Application Priority Data

Aug. 8, 1974 Japan .................. 49-91295
Sept. 18, 1974 Japan .................. 49-107537

[51] Int. Cl.$^2$ .................................. G01J 1/20
[52] U.S. Cl. ........................ 250/201; 250/209; 250/214 P; 354/25
[58] Field of Search ............ 250/201, 204, 208, 209, 250/237, 214 P; 354/25, 162; 356/4, 125, 126

[56] References Cited

U.S. PATENT DOCUMENTS

| | | | |
|---|---|---|---|
| 3,631,785 | 1/1972 | Perlman et al. .................. | 250/204 |
| 3,714,524 | 1/1973 | Katsuyama .................... | 250/201 |
| 3,723,003 | 3/1973 | Vockenhuber et al. .......... | 356/4 |
| 3,736,057 | 5/1973 | Harvey ......................... | 250/201 |
| 3,844,658 | 10/1974 | Gela et al. .................... | 250/201 |
| 3,906,389 | 9/1975 | Matsumoto et al. ............ | 354/25 |

*Primary Examiner*—David C. Nelms
*Attorney, Agent, or Firm*—Wenderoth, Lind & Ponack

[57] ABSTRACT

A focus detecting photoelectric device herein disclosed is usable in a focus control system and is placed on an image plane where an optical image of a subject to be, for example, photographed through an objective lens assembly is focused to detect whether the image has been exactly focused or whether the image is out of focus. An output signal from the photoelectric device herein disclosed is used to control the focus control system to effect the desired focus control in relation to the objective lens assembly. To this end, the focus detecting photoelectric device is composed of at least one group of photoelectric elements, such as photodiodes, connected in series to each other with the cathode of one photoelectric element connected to the anode of the other photoelectric element. These photoelectric elements of the group may be formed on a semiconductor substrate in a predetermined pattern by the use of a known IC circuit making technique.

6 Claims, 15 Drawing Figures

FOCUS DETECTING PHOTOELECTRIC DEVICE

The present invention generally relates to an automatic focus control instrument in a photograhic or television camera and, more particularly, to a focus detecting photoelectric device utilizable in such a automatic focus control instrument as a spatial filter for providing an electric signal to be subsequently processed to control the focusing operation of an objective lens assembly of the photographic or television camera.

In general, the spatial frequency of the light which makes up the image projected through an objective lens assembly is known to have such properties that, when the image is sharply focused on an image plane of the objective lens assembly, the amplitude of an A.C. component of the output of a photoelectric device on the objective lens due to the spatial frequency attains a maximum value and that the amplitude of the spatial frequency varies considerably when the spatial frequency in question is within a relatively high frequency range. Various spatial filters, or focus detecting photoelectric devices, utilizing the above described properties have heretofore been developed, one of which is, for example, disclosed in the Japanese Published Patent Specification No.13964/1972, which was laid open to public inspection on July 26, 1972.

According to the Japanese Published Patent Specification, there is disclosed a photoelectric device for, when energized, detecting the intensity of a particular component of the spatial frequencies of the light which make up the image, the details of which device will now be described with particular reference to FIGS. 1 to 3 of the accompanying drawings.

The photoelectric device according to the Japanese Published Patent Specification referred to above comprises a first group of photo-diodes $A_1$, $A_2$, $A_3$ . . . and $A_n$ electrically connected in parallel with each other and arranged side by side in spaced relation to each other and a second group of photo-diodes $B_1$, $B_2$, $B_3$ . . . and $B_n$ arranged on the same plane as the photo-diodes of the first group in such a manner that each one of the photo-diodes of the second group is positioned between each adjacent two photo-diodes of the first group. Each of the photo-diodes of the first and second groups comprises, as shown in FIG. 2, a cathode 1, a light receiving surface 2, and an anode 3 and the photo-diodes of the first and second groups, which make up the photoelectric device of the Japanese Published Patent Specification referred to above, must have individual light receiving surfaces 2 of the same surface area and also of the same sensitivity and be arranged on the same plane spaced a distance of $\phi$ from each other. As shown in FIG. 1, these photo-diodes of the first and second groups are electrically connected in such a manner that the cathodes of all of the photo-diodes of the first and second groups are connected to each other and in turn to a common terminal 4, the anodes of the photo-diodes of the first group are connected to each other and in turn to a common terminal 5 and the anodes of the photo-diodes of the second group are connected to each other and in turn to a common terminal 6.

Assuming that the photoelectric device having the construction described above is placed on the image plane where an image of a subject is to be focused, and when the image is projected onto said image plane through an objective lens assembly, a potential difference will be generated between the electric power to be supplied to a load circuit 7, which is connected between the terminals 4 and 5, and that to be supplied to a load circuit 8 which is connected between the terminals 4 and 6. The potential difference thus obtained is so indicative of the intensity of a particular spatial frequency that, if the potential difference is maximized by adjusting the position of the objective lens assembly relative to the image plane where the photoelectric device is placed, the image can be indicated as being exactly focused on the image plane at the moment the potential difference has attained the maximum value.

In the known focus control system utlizing the photoelectric device referred to above, in the case where an image having a spatial frequency component of $\frac{1}{2} \cdot \phi$ lines per millimeter is consecutively projected onto a light receiving area of the photoelectric device in such a manner that, for example, the photo-diodes of the first group receive more of the incoming light than the photo-diodes of the second group receive, more electric power will be supplied to the load circuit 7 than to the load circuit 8. This is particularly true where the target image to be focused exhibits sufficiently favorable characteristics to perform the focus control. In practice, most target images to be, for example, photographed are composed of irregularly, not regularly, distributed particular spatial frequency components and, accordingly, in an extreme case, the conventional photoelectric device of the construction shown in FIG. 1 fails to give an electric output even when the image has been exactly focused on the image plane.

In other words, even if there exists a difference in the intensity of light received by some of the photo-diodes forming the conventional photoelectric device, electric outputs from all of the photo-diodes are often cancelled by each other and, as a result thereof, the photoelectric device gives an electric signal indicative of the cancelled result. In view of this, the conventional photoelectric device for focus detection having the construction shown in FIG. 1 has the disadvantage in that it does not provide an electric output signal effective to enable the focus control system to perform a reliable and effective focus control.

There is known another automatic focus control system utilizing a photoconductive cell, the electric equivalent circuit of which photoconductive cell is shown in FIG. 4. This type of automatic focus control system is disclosed in the U.S. Pat. No. 3,511,155, patented on May 12, 1970. As shown in FIG. 4, the photoconductive cell, made of, for example, CdS or CdSe, can be considered to be composed of a series of Wheatstone bridges each having resistances $r$, $r'$, $r''$ and $r'''$ and is operable in such a manner that when A.C. voltage is applied between terminals 11 and 12 and there exists some unbalanced bridges, a positive or negative potential is generated at a terminal 13 relative to a terminal 14

Since the photoconductive cell has a light receiving surface formed by a photoconductive material such as CdS or CdSe, difficulties have been found with respect to sensitivity and response characteristics and, moreover, the use of the photoconductive cell often imposes limitation on the design of one or both the circuit for processing the output from the photoconductive cell and a device therefor.

Accordingly, an essential object of the present invention is to provide an improved photoelectric device utilizable for focus detection, which can effectively be employed in a focus control system, with substantial elimination of the disadvantages inherent in the conventional focus detecting devices.

Another object of the present invention is to provide an improved focus detecting photoelectric device which utilizes a plurality of photo-diodes of substantially identical performance and which can, therefore, be easily and inexpensively manufactured.

In accomplishing these objects of the present invention, there is provided an improved focus detecting photoelectric device which comprises an array of at least one pair of series connected photoelectric elements, for example, semiconductor photo-diodes such as silicon photovoltaic cells, both of said photoelectric elements being substantially identical with each other in respect to the surface area of a light receiving surface and also the sensitivity and being arranged side by side on the same plane.

These and other objects and features of the present invention will become apparent from the following description of preferred embodiments thereof taken in conjunction with the accompanying drawings, in which.

Before the description of the present invention proceeds, it should be noted that like parts are designated by like reference numerals throughout the accompanying drawings.

Figure 5:
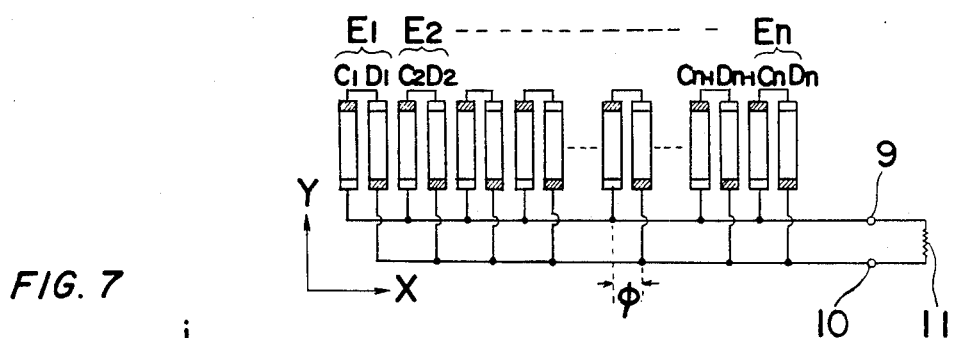
FIG. 5 is a schematic diagram showing the arrangement of photoelectric elements forming a focus detecting photoelectric device according to one preferred embodiment of the present invention.

Referring first to FIG. 5, there is shown a focus detecting photoelectric device which comprises an array of a plurality of groups $E_1$, $E_2$ . . . and $E_n$ of series-connected photoelectric elements $C_1$ and $D_1$, $C_2$ and $D_2$ . . . and $C_n$ and $D_n$. These groups $E_1$, $E_2$ . . . and $E_n$ of the photoelectric elements are arranged side by side on the same plane while the cathode of one of the series-connected photoelectric elements of each group is electrically connected to the anode of the other of the series-connected photoelectric elements of the same group. On the other hand, the anode of said one of the series-connected photoelectric elements of each group and the cathode of said other of said series-connected photoelectric elements of said group are respectively connected to associated terminals 9 and 10.

It should be noted that the photoelectric elements of each group $E_1$, $E_2$ . . . and $E_n$ must have the same sensitivity to the incoming light and also the same light receiving surface area and, hence, must have the same or substantially identical performance characteristic. However, the groups of the photoelectric elements may have different light receiving surface areas and, hence, different performance characteristics.

In the embodiment shown in FIG. 5, each group of the photoelectric elements is shown as being composed of two series-connected photoelectric elements $C_1$ and $D_1$, $C_2$ and $D_2$ . . . or $C_n$ and $D_n$ while the photoelectric elements of all of the groups $E_1$, $E_2$ . . . and $E_n$ are arranged side by side on the same plane in a row spaced at equal distances from each other. However, each group may be composed of three or more photoelectric elements, and they must satisfy the requirements that (1) the photoelectric elements of each group must be connected in series with each other with the same orientation in polarity with respect to the direction of flow of current, (2) they must have the same or substantially identical performance characteristics and (3) they must be arranged side by side on the samel plane. Moreover, all of the groups $E_1$, $E_2$ . . . and $E_n$ of the photoelectric elements need not always be arranged side by side in a row extending in one direction, but may be arranged in different directions and in any pattern other than the row while the side-by-side arrangement of the photoelectric elements of each group is preserved.

More specifically, if all of the groups of the photoelectric elements are arranged in different directions with respect to each other while the photoelectric elements of each group are arranged side by side, the photoelectric device can be designed such that the individual groups of the photoelectric elements can, because the photoelectric elements of each group respond to the spatial frequencies distributed in the same directions as the directions of arrangement of the groups of the photoelectric elements, detect spatial frequency components distributed in the same directions as the directions of arrangement of said groups of said photoelectric elements.

In addition, the photoelectric elements in all of the groups need not be spaced an equal distance $\phi_i$ from each other as shown, but the elements in one group may be spaced different distances from the spacing of the elements in other groups, in which case the spatial frequencies to be detected differ from each other in such a way that the photoelectric elements of some groups, which are spaced a relatively small distance from each other, will detect relatively high components of the spatial frequencies while the photoelectric elements of the remaining groups, which are spaced a relatively great distance from each other, will detect relatively low components of the spatial frequencies.

The operation of the photoelectric device of the construction shown in FIG. 5 will now be described with reference to FIGS. 6 and 8. It is to be noted that the electric circuit $Ei$ shown in FIG. 6 as having one group of series-connected photoelectric elements C and D can be considered an equivalent circuit of FIG. 5.

Figure 7:
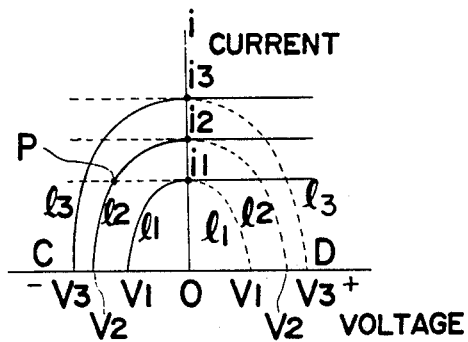
FIG. 7 is a graph illustrating output characteristics of the photoelectric elements shown in the circuit of FIG. 6.

Referring first to FIG. 7, it is assumed that the photoelectric elements C and D have the same performance characteristic in terms of the relationship between current and voltage with respect to different intensities of light $l_1$, $l_2$ and $l_3$ received thereby, the characteristics of said individual photoelectric elements C and D being respectively shown by the solid lines and the broken lines.

Figure 6:
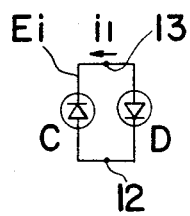
FIG. 6 is a circuit diagram of one pair of the photoelectric elements shown in FIG. 5.

Referring now to FIGS. 6 and 7, assuming that the photoelectric element C receives incident light of an intensity $l_1$ while the photoelectric element D at this time receives no incident light, the photoelectric element C generates a negative voltage of a value $V_1$ thereacross as viewed from the anode side 12 towards the cathode side 13 of the photoelectric element C. At this time, the photoelectric element D is reverse-biased and, accordingly, no current flows therethrough except for leakage current resulting from the reverse-bias of the element D which can be neglected. However, when both the photoelectric elements C and D receive incident light of the same intensity $l_1$, the voltage across the photoelectric element C is cancelled by the voltage across the photoelectric element D and a shortcircuiting current $i_1$ flows from the anode side 12 towards the cathode side 13 in the direction indicated by arrow $i$. In this way, only when the photoelectric elements C and D simultaneously receive incident light, a current flows in proportion to the intensity of the incident light received thereby.

On the other hand, if the photoelectric element C receives incident light of an intensity $l_2$ while the photoelectric element D receives at this time an incident light of an intensity $l_1$ which is lower than the intensity $l_2$, the photoelectric element D will be reverse-biased by the photoelectric element C which generates thereacross a voltage of a value higher than that generated by the photoelectric element D. The value of the current which flows in the circuit of FIG. 6 at this time corresponds to the value represented by the intersecting point P, shown in FIG. 7, between the curves $l_2$ and $l_1$ respectively represented by the solid line and the broken line, that is, determined by the photoelectric element D. In this way, where there is a difference between the intensity of the incident light received by the photoelectric element C and that received by the photoelectric element D, a current the value of which is limited by the one of the photoelectric elements C and D which has received incident light of less intensity than that received by the other of the photoelectric elements flows in the circuit of FIG. 6 only in one direction.

Accordingly, it will readily be seen that, if the single group of the photoelectric elements C and D series-connected to each other and arranged side by side is placed on the image plane of the objective lens assembly, since the highest contrast of an image can be obtained when the image is focused on the image plane through the objective lens assembly, the current which will flow in the circuit of FIG. 6 at this time will be of a minimum value.

Figure 4:
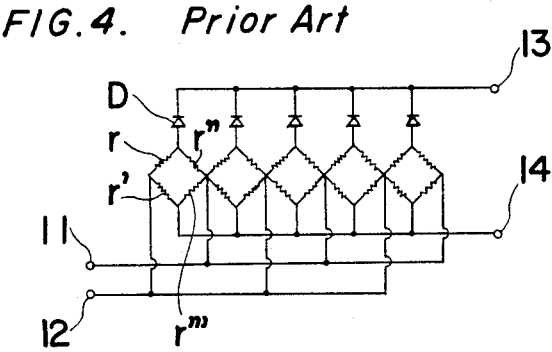
FIG. 4 is an electric circuit diagram of another prior art focus detecting photoelectric device.
Figures 2, 3:
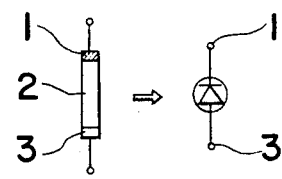
FIG. 2 is a schematic diagram of one photo-diode showing the construction thereof.
FIG. 3 is an equivalent circuit of the photo-diode of FIG. 2.

The arrangement of the photoelectric elements shown in FIG. 5 can, therefore, be considered as composed of parallel-connected circuits each having the construction shown in FIG. 6 if an external resistance 11, forming a load circuit, is neglected. Accordingly, where the photoelectric device of FIG. 4 is placed on the image plane of the objective lens assembly, the current generated by each group $E_1$, $E_2$... and $E_n$ of the photoelectric elements will be of a minimum value when the image is focused on the image plane through the objective lens assembly and, consequently, the current which will flow through the resistance 11 connected between the terminals 9 and 10 will also become a minimum value.

As hereinbefore described, in the photoelectric device according to the present invention, electric signals emerging from the respective groups of the photoelectric elements are added to each other without being cancelled and, accordingly, a greater difference between the level of output from the photoelectric device, which is generated when the image is focused, and that which is generated when the image is out of focus can be achieved than in the conventional focus detecting photoelectric devices.

Figure 1:
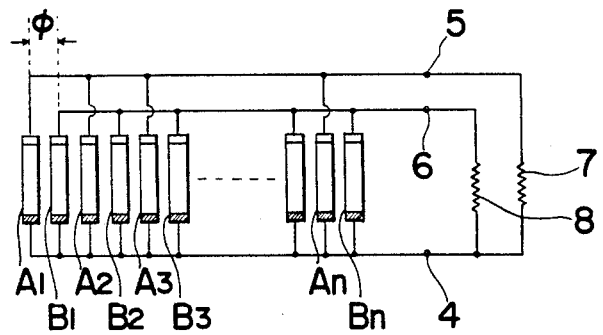
FIG. 1 is a schematic diagram showing the arrangement of photo-diodes used in the prior art focus detecting photoelectric device.

The individual photoelectric elements $C_1$ to $C_n$ and $D_1$ to $D_n$, forming the photoelectric device according to the embodiment shown in FIG. 5, can be formed in a predetermined pattern or arrangement on a semiconductor substrate or chip by the use of a known IC circuit making technique. By suitably selecting the orientation of the groups of the photoelectric elements, the surface area of the individual light receiving surface of each of the groups of the photoelectric elements, and/or as the spacing between each two adjacent members of the photoelectric element, the photoelectric device according to the present invention can be caused to effectively give an output signal not only for particular subjects to be photographed which are composed of spatial frequencies such as those distributed in a horizontal direction, but also for any other conventional subject to be photographed. Moreover, while the photoelectric device having the construction shown in FIG. 1 must to be oscillated during operation of the focus control system, the photoelectric device according to the present invention need not, as a rule, be oscillated during operation of the focus control system.

In certain circumstances, the photoelectric device having the construction shown in FIG. 5 will generate an output signal which may be disturbed by an external noise. By way of example, where a subject to be photographed is illuminated by a fluorescent lamp energized by, for example, a 60 cycle A.C. power, the brightness of the illuminated subject varies at a frequency corresponding to twice the frequency of the A.C. power with respect to a predetermined level of brightness. Accordingly, there might be a possibility that the output signal from the photoelectric device of FIG. 5 is mixed with these frequency components resulting from variation of the brightness of the subject illuminated by the fluorescent lamp, to an extent that an accurate and exact focus control cannot be achieved. In order to avoid this possibility, one or more additional photoelectric elements, for example, photo-diodes such as photovoltaic cells, may be employed independent of the photoelectric elements $C_1$ to $C_n$ and $D_1$ to $D_n$. An example of the use of the additional photoelectric elements corresponding in number to the number of the groups $E_1$ to $E_n$ of the photoelectric elements employed in the arrangement of FIG. 5 is illustrated in FIG. 8, reference to which will now be made.

Figure 8:
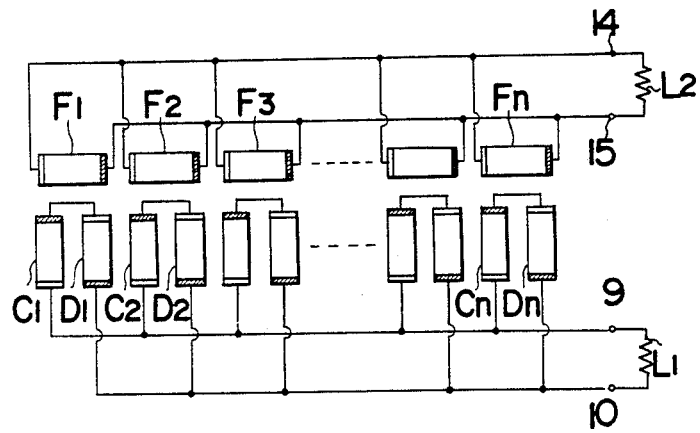
FIG. 8 is a schematic diagram showing the arrangement of photoelectric elements forming a focus detecting device according to another preferred embodiment of the present invention.

In the arrangement shown in FIG. 8, the additional photoelectric elements $F_1$, $F_2$ ... and $F_n$, electrically connected in parallel to each other between terminals 14 and 15 are positioned one adjacent each group of the photoelectric elements $C_1$ and $D_1$, $C_2$ and $D_2$ ... and $C_n$ and $D_n$. These additional photoelectric elements $F_1$ to $F_n$ act to detect a D.C component of the spatial frequencies of the target image so that a component of the A.C. power included in the output signal can be cancelled after said component has been detected by said additional photoelectric elements $F_1$ to $F_n$.

More specifically, assuming that the target image is out of focus and the same amount of incident light impinges upon a set of three photoelectric elements $C_1$, $D_1$ and $F_1$ and again assuming that the respective resistances of load circuits $L_1$ and $L_2$ respectively connected between the terminals 9 and 10 and between the terminals 14 and 15 are zero, the values of currents respectively flowing through the load circuits $L_1$ and $L_2$ are equal to each other. With respect to the variation in brightness of the subject illuminated by a fluorescent lamp, the currents respectively flowing through the load circuits $L_1$ and $L_2$ vary in the same phase so that components of the signal which have the same phase can be cancelled. To achieve this, for example, a differential amplifier may be used to effect such cancellation. However, since the current flowing in the load circuit $L_1$ at the time the image has been focused on the image plane attains a minimum value, a difference exists between portions of the currents respectively flowing through the load circuits $L_1$ and $L_2$ which correspond to the frequency of the A.C. power used to energize the fluorescent lamp. Accordingly, complete removal of the component of the A.C. power frequency from the output signal indicative of the focused condition of the image may be impossible depending upon the condition of the image, the rate of the A.C. component relative to the D.C. component included in the rays of light from the illumination source and other factors.

Figure 9:
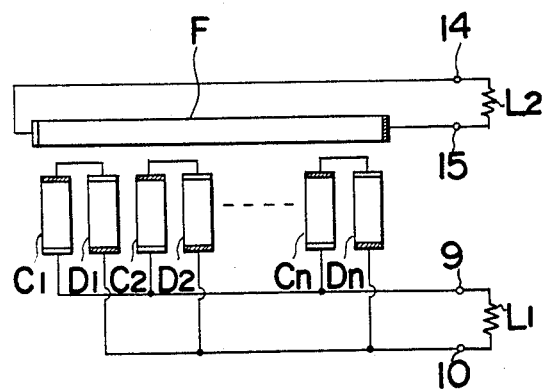
FIG. 9 is a similar diagram to FIG. 8, showing a further preferred embodiment of the present invention.

In the embodiment shown in FIG. 9, only one additional photoelectric element F is employed. This additional photoelectric element F functions in a substantially similar manner to the photoelectric elements $F_1$ to $F_n$ in the preceding embodiment and is designed so as to have a light receiving area of a size sufficient to cover the entire length of the row of the photoelectric elements $C_1$ and $D_1$, $C_2$ and $D_2$ ... and $C_n$ and $D_n$ of the respective groups $E_1$, $E_2$ ... and $E_n$.

In connection with each of the foregoing embodiments of FIGS. 5, 8 and 9, it has been described that the current flowing between the terminals 9 and 10 attains a minimum value, when the image is exactly focused on the image plane, exhibiting a phenomenon similar to a so-called "dip effect". If the minimum value of the current can be detected in this way, the focus control of the objective lens assembly is completed at the moment the minimum value has been detected.

On the other hand, as is well known to those skilled in the art, the effective f-number of the objective lens assembly of, for example, a photographic camera tends to vary as the objective lens assembly is displaced in a direction parallel to the optical axis of the photographic camera in pursuit of a true focus. Accordingly, the photocurrent available from the photoelectric device of any of the foregoing embodiments tends to decrease as the objective lens assembly is axially displaced. In other words, even when the image is out of focus, the photoelectric device of any of the foregoing embodiments continues to generate output current corresponding to the brightness of the image received by the photoelectric device. This is undersirable and, in order to avoid it and concurrently to cause the focus control system to undergo a precise focus control operation, special and expensive means is necessitated in the signal processing circuit for converting the light into an electric signal.

In order to avoid the foregoing disadvantage without necessitating such special and expensive means, the focus detecting photoelectric device of any of the foregoing embodiments of FIGS. 5, 8 and 9 may be provided with diodes in a number equal to the number of the photoelectric elements $C_1$ to $C_n$ and $D_1$ to $D_n$, which will now be described with reference to FIGS. 10 to 12.

The diodes referred to above are indicated by $d_1$, $d_2$ ... and $d_n$, and one is inserted between a terminal 16 and a junction of each of the photoelectric elements of the associated groups. More specifically, each of the diodes $d_1$ to $d_n$ has the anode connected to the junction between the photoelectric elements $C_1$ and $D_1$, $C_2$ and $D_2$ ... or $C_n$ and $D_n$ of the associated group and the cathode is connected to the terminal 16. Alternatively. each of the diodes $d_1$ to $d_n$ may be connected in such a manner that the anode is connected to the terminal 16 while the cathode is connected to the junction between the photoelectric elements of the associated group.

In the manufacture of the photoelectric device according to the present invention, the photoelectric elements $C_1$ to $C_n$ and $D_1$ to $D_n$ of all of the groups may be formed on a single semiconductor substrate by the use of a known IC circuit making technique together with the diodes $d_1$ to $d_n$. Alternatively, as shown in FIG. 14, a unit comprised of the photoelectric elements $C_1$ to $C_n$ and $D_1$ to $D_n$ and a unit comprised of the diodes $d_1$ to $d_n$ may be formed on separate semiconductor substrates by the use of the known IC circuit making technique and be subsequently electrically connected in a predetermined manner.

Figure 10:
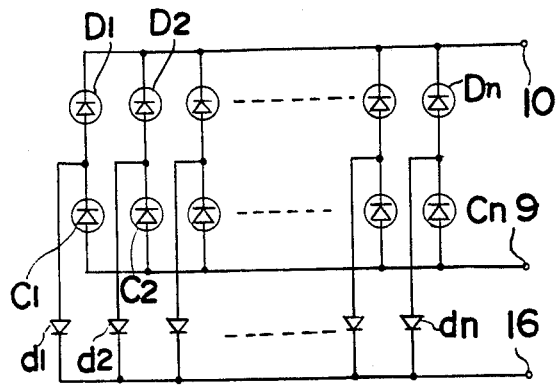
FIG. 10 is an electric circuit diagram showing the arrangement of photoelectric elements forming a focus detecting photoelectric device according to a still further embodiment of the present invention.

Preferably, the photoelectric element groups in the embodiment of FIG. 10 are arranged, in terms of the orientation, the shape of the individial light receiving surfaces and the spacing between the photoelectric elements of each group, such that the resultant photoelectric device according to the embodiment of FIG. 10 can detect a relatively high component of the spatial frequency of the image to be photographed.

The operation of the arrangements of FIGS. 10 and 14 will now be described with reference to FIG. 11.

Figure 11:
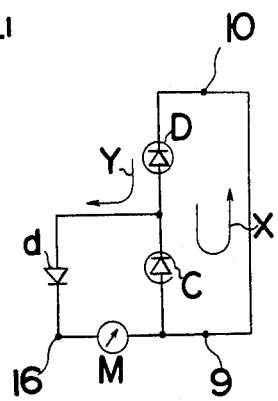
FIG. 11 is an electric circuit diagram of a portion of the photoelectric device of FIG. 10, which is used to explain the principle of operation of the photoelectric device of FIG. 10.
Figure 12:
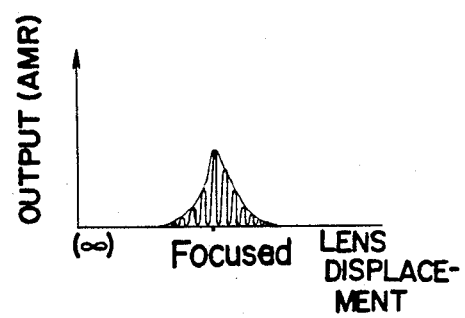
FIG. 12 is a graph showing relationship between the output level in the circuit of FIG. 11 and the displacement of an objective lens assembly during a focusing operation.
Figure 14:
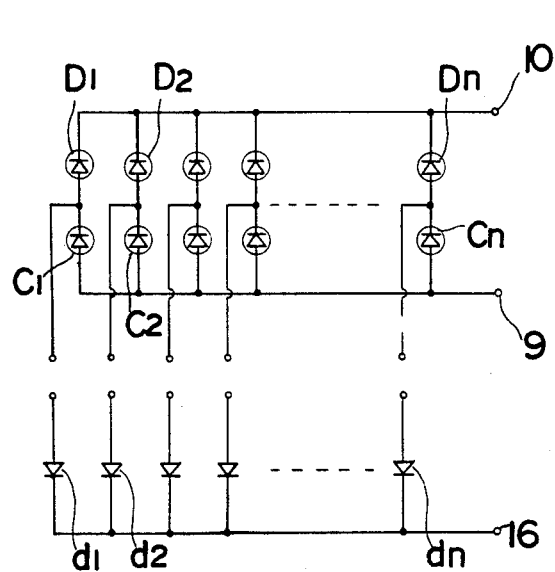
FIG. 14 illustrates a modification of the circuit of FIG. 10.

Assuming that the photoelectric device having the construction of FIG. 10 or 14 is placed on the image plane of the objective lens assembly and the image projected onto said image plane through said objective lens assembly is out of focus, the photoelectric elements C and D receive incident light of the same intensity and, tberefore, the photoelectric elements C and D generate respective currents of the same value in response to receipt of the incident light of the same intensity, which currents flow in the same direction from the anode of the photoelectric element C towards the cathode of the photoelectric element D as indicated by the arrow in FIG. 11. Consequently, no current flows through the diode d via the junction between the photoelectric elements C and D in a direction indicated by the arrow Y.

When the image, which has been projected onto the image plane of the objective lens assembly, is subsequently exactly focused, the contrast of the image increases and, accordingly, there will be created a difference between the intensity of light received by the photoelectric element C and that received by the photoelectric element D. If the intensity of light received by the photoelectric element D is, by way of example, higher than that received by the photoelectric element C due to the sharp contrast of the focused image, the photoelectric element D generates a higher voltage than that generated by the photolelctric element C and the value of potential appearing at the junction between the photoelectric elements C and D becomes higher than the potential appearing at the terminal 9. Consequently, current flows from the junction between the photoelectric elements C and D towards the terminal 16 through the diode $d$.

On the other hand, if the intensity of light received by the photoelectric element D is lower than that received by the photoelectric element C, the photoelectric element C tends to generate a higher voltage than that generated by the photoelectric element D. However, since no circuit exists for extracting a current corresponding to this type of difference between the potentials respectively generated by the photoelectric elements C and D, the current regulated by the photoelectric element D can flow in the direction X without flowing in the direction Y. Accordingly, if the focus detecting photoelectric device is composed of, for example, one or a few groups of the photoelectric elements and is, during the use thereof, oscillated a distance substantially equal to the spacing between the photoelectric elements of each group, a pulsating current of a waveform such as shown in FIG. 12 will flow thrugh the diode d when the image of the subject to be photographed is focused on the image plane of the objective lens assembly.

In summary, the photoelectric device of the construction shown in FIG. 10 is such that, when the image is exactly focused on the image plane where it is placed, a difference is created between the voltages respectively generated by the photoelectric elements C and D. Therefore, an electric signal necessary to effect the focus control by means of the focus control system can be obtained by externally processing a current corresponding to the difference.

Figure 13:
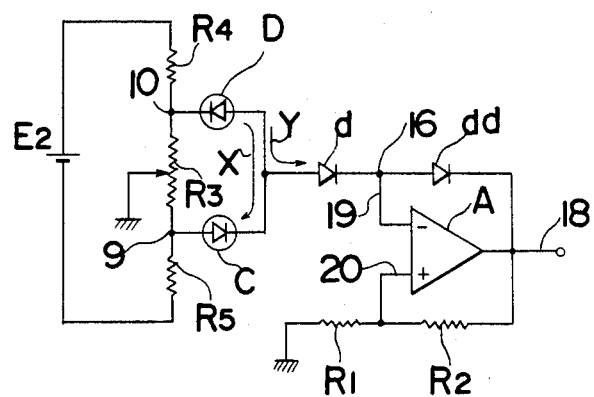
FIG. 13 is an electric circuit diagram utilizing the photoelectric device of FIG. 10.

In practice, the circuit of FIG. 11 is designed as shown in FIG. 13.

With particular reference to FIG. 13, respective series of the photoelectric elements $C_1$ to $C_n$ and $D_1$ to $D_n$ are, in the circuit of FIG. 13, represented by the photoelectric elements C and D while the series of the diodes $d_1$ and $d_n$ are represented by the diode $d$. Reference character A represents an operational amplifier having an output line 18 and two input lines 19 and 20. One of the input lines 19 and the output line 18 of the operational amplifier A are respectively connected to the anode and cathode of a diode $dd$ and the other input line 20 of said operational amplifier A is connected to resistors $R_1$ and $R_2$, the resistor $R_2$ being in turn connected to the output line 18 and the resistor $R_1$ being in turn connected to the ground.

A circuit composed substantially of a source of electric power $E_2$ and series-connected resistors $R_4$, $R_3$ and $R_5$ acts as a circuit for applying a reverse-bias voltage to the photoelectric elements C and D. It is to be noted, that when current flows in the direction indicated by the arrow Y in FIG. 13, voltage appears across the diode $d$ and also across the diode $dd$ and, accordingly, the ratio between the respective resistances of the resistor $R_1$ and $R_2$ is selected to be substantially equal to the ratio between the respective voltages across the diode $d$ and the diode $dd$.

In the circuit construction of FIG. 13, when the image is out of focus and the photoelectric elements C and D receive the incoming light of the same intensity, the current proportional to the intensity of the incoming light received by said photoelectric elements flows in the direction indicated by the arrow X and no current flows in the direction indicated by the arrow Y. Consequently, voltage appearing on the output line 18 of the operational amplifier A becomes ground level.

On the other hand, when the image is exactly focused on the image plane and the photoelectric element D receives the incoming light of higher intensity than that received by the photoelectric element D, the current generated by the photoelectric element D overflows towards the diode $d$ in the direction indicated by the arrow Y. The greater the difference in the intensity of light received by the photoelectric elements C and D, the greater the overflow current. However, since the respective resistances of the resistors $R_1$ and $R_2$ are selected as hereinbefore described, the output voltage appearing at the output line 18 of the operational amplifier becomes substantially equal to the voltage between the output line 18 and the junction of the photoelectric elements C and D and, consequently, the output voltage becomes sufficiently proportional to a logarithmic value of the overflow current that, even if this overflow current varies over a relatively wide range, the output voltage can be maintained within a predetermined range. In addition, since the voltage at the junction between the photoelectric elements C and D is maintained at a ground level, reliable responsivity of the individual photoelectric elements C and D to the incoming light can be ensured.

On the other hand, if the intensity of light received by the photoelectric element C is higher than that received by the photoelectric element D, no overflow current such as hereinbefore described will be generated and, therefore, no output is generated from the output line 18 of the operational amplifier A. However, in practice, a component of the overflow current appears to flow from one or some of the groups of the photoelectric elements, shown in FIG. 10, towards the diode dd.

It is to be noted that the terminals 9 and 10 in the circuit of FIG. 13 may be shortcircuited to each other.

Figure 15:
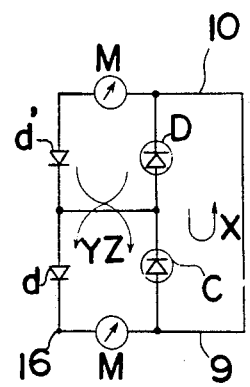
FIG. 15 illustrates a modification of the circuit of FIG. 11.

As hereinbefore described, in the circuit of FIG. 11, no output is available where the intensity of light impinging upon the photoelectric element C is higher than that impinging upon the photoelectric element D. However, if an additional diode $d'$ is connected in parallel with the photoelectric element D, as shown in FIG. 15, in a substantially similar manner as the diode $d$ is connected in parallel with the photoelectric element C, the potential at the junction between the photoelectric elements C and D becomes lower than that at the terminals 9 and 10, when the intensity of light impinging upon the photoelectric element C is higher than that impinging upon the photoelectric element D, and consequently, current will flow through the diode $d'$ towards the cathode of the photoelectric element C in a direction as indicated by the arrow Z. In the circuit of FIG. 15, although the currents respectively flowing in the direction as indicated by the arrows Y and Z can be extracted separately, signal components available from the currents flowing in the directions Y and Z can easily be added to each other by the use of any suitable circuit means.

Although the present invention has fully been described by way of the preferred embodiments thereof, it should be noted that various changes and modifications will be apparent to those skilled in the art. Such changes and modifications, unless they depart from the true scope of the present invention, are to be understood as included therein.

What is claimed is:

1. A focus control system for detecting a focused condition of an optical image, comprising: an objective lens assembly through which the optical image is projected, and a focus detecting photoelectric device, the path of the optical image from the objective lens to the focus detecting photoelectric device being unobstructed, said device having: a first terminal, a second terminal; and a plurality of groups of photodiodes, each of said photodiodes having an anode and a cathode, the anode of a first photodiode of said each group being connected to said first terminal, and the anode of a second photodiode of said each group being connected to the cathode of said first photodiode of the same group and the cathode of said second photodiode of each group being connected to said second terminal, the photoelectric characteristics of the photodiode in each group being substantially equal to each other, each of said photodiodes having a light receiving surface positioned to receive the light carrying the image from said objective lens assembly, said photodiodes being positioned with said light receiving surfaces thereof located in the same plane which plane is the plane on which the optical image is projected and the light receiving surfaces of said first and second photodiodes in each group being adjacent to each other, whereby the current output between said first and second terminals is at its minimum when the amplitude of spatial frequency of the light on said plane is at its maximum.

2. A photoelectric device as claimed in claim 1 further comprising third and fourth terminals and at least one additional photodiode connected between said third and fourth terminals, said additional photodiode having a light receiving surface located adjacent to the light receiving surfaces of said first and second photodiodes in one of the groups and in said same plane, the light receiving surface of said additional photodiode being longer than the distance between the light receiving surface of said first photodiode in said one group and that of said second photodiode in the same group, whereby the current output obtained between said third and fourth terminals represents an approximate average of the intensity of light impinging on the light receiving surfaces of said first and second photodiodes in said one group.

3. A photoelectric device as claimed in claim 1 further comprising a plurality of further terminals, the respective further terminals being connected to the junctions between said first and second photodiodes in the respective groups.

4. A photoelectric device as claimed in claim 1 further comprising a third terminal and a plurality of diodes, the one electrodes on the respective diodes being connected to the junction between said first and second photodiodes in respective groups, and the other electrodes of the diodes being connected to said third terminal, whereby the current output obtained between one of said first and second terminals and said third terminal when a circuit is provided between said first and second terminals is at its maximum when the amplitude of the spatial frequency of light impinging on said plane is at its maximum.

5. A photoelectric device as claimed in claim 4 wherein said one of the electrodes of the diodes is the anode.

6. A photoelectric device as claimed in claim 1 wherein said light receiving surfaces are elongated shapes and are arranged in side by side relation.

* * * * *